(12) United States Patent
Höveling

(10) Patent No.: US 6,717,701 B1
(45) Date of Patent: Apr. 6, 2004

(54) SIGNAL PROCESSING METHOD

(75) Inventor: Axel von Höveling, Kiel (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/424,755
(22) PCT Filed: May 27, 1998
(86) PCT No.: PCT/DE98/01442
§ 371 (c)(1), (2), (4) Date: Feb. 17, 2000
(87) PCT Pub. No.: WO98/55303
PCT Pub. Date: Dec. 10, 1998

(30) Foreign Application Priority Data

Jun. 2, 1997 (DE) .......... 197 22 760

(51) Int. Cl.⁷ ............... B41C 1/045
(52) U.S. Cl. .......... 358/3.29; 358/3.3
(58) Field of Search .......... 358/3.31, 3.32, 358/3.29, 3.3, 406

(56) References Cited

U.S. PATENT DOCUMENTS 3,893,166 A   7/1975   Pugsley
5,424,845 A   6/1995   Holowko et al.

FOREIGN PATENT DOCUMENTS

| DE | WO 98/55303 | * 12/1998 |
| WO | WO 94/19900 | 1/1994 |
| WO | WO 96/26836 | 6/1996 |
| WO | WO 96/26837 | 6/1996 |

\* cited by examiner

Primary Examiner—Thomas D. Lee
(74) Attorney, Agent, or Firm—Schiff Hardin & Waite

(57) ABSTRACT

In a method for processing signals in an electronic engraving machine for engraving printing forms, engraving control signals for guiding the stylus of an engraving element are obtained from engraving data representing predetermined tone values between "light" (white) and "dark" (black). The stylus engraves a series of cups in the printing form. The cup depths determine the tone values actually engraved. Before engraving, the engraving control signals corresponding to "light" and "dark" are calibrated by adjustment variables so that the engraved "light" and "dark" tone values correspond to the predetermined "light" and "dark" tone values. So that the "light" engraved tone value remains constant when the "dark" tone value changes, the difference between the old "dark" adjustment variable and a new "dark" adjustment variable is formed before engraving. A new "light" adjustment variable is then calculated on the basis of this difference, and is used to automatically recalibrate the engraving control signals for "light", so that the "light" tone value remains constant.

6 Claims, 3 Drawing Sheets

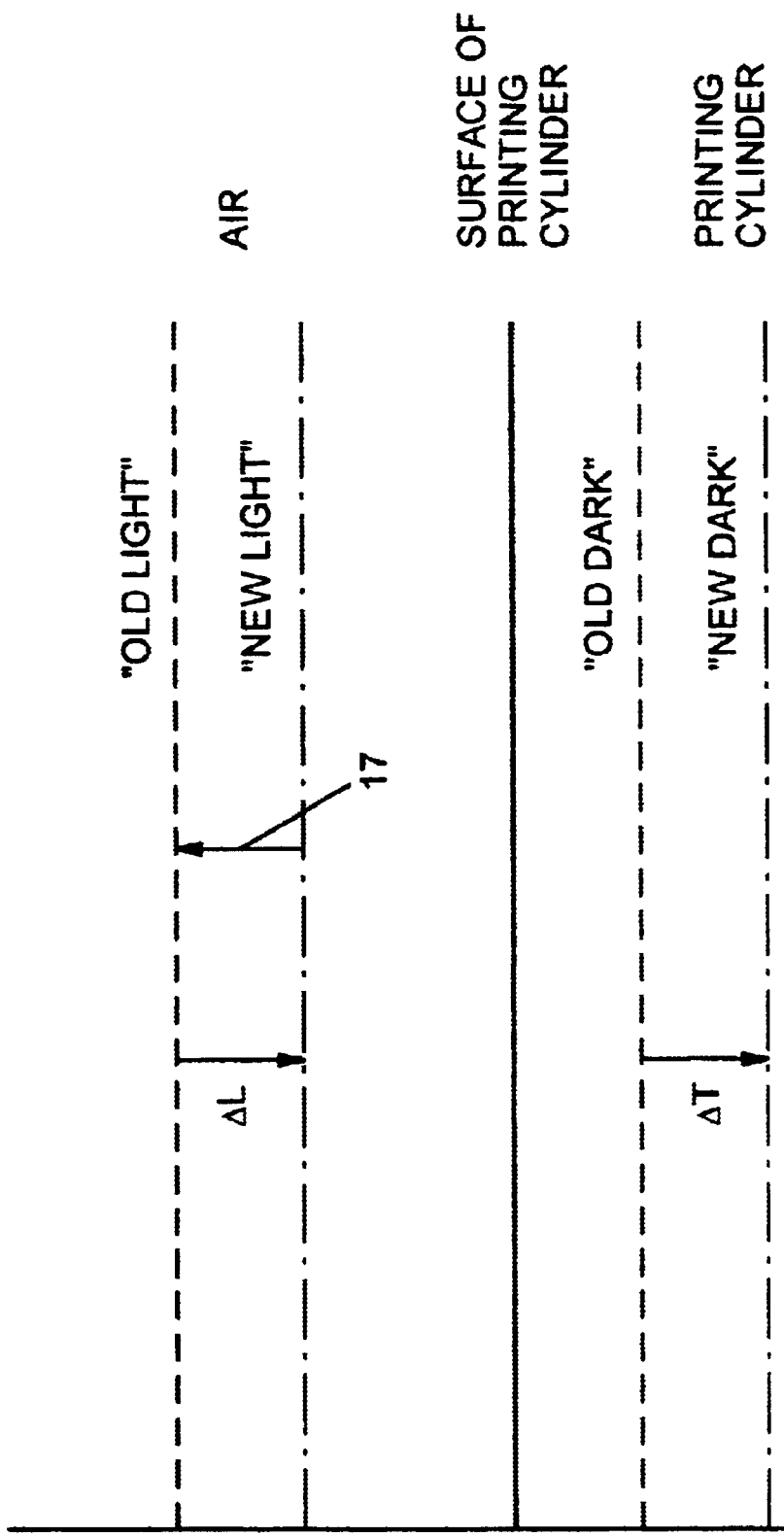

SIGNAL PROCESSING METHOD

BACKGROUND OF THE INVENTION

The invention is in the field of electronic reproduction technology and is directed to a method for signal processing in an electronic engraving machine for engraving printing forms, particularly printing cylinders, for rotogravure.

In an electronic engraving machine, an engraving element with an engraving stylus as a cutting tool moves along a rotating printing cylinder in an axial direction. The engraving stylus controlled by an engraving control signal cuts a sequence of depressions, called cups, arranged in a rotogravure raster into the generated surface of the printing cylinder. The engraving control signal is formed in a signal editing unit by superimposition of an engraving signal representing the gradations between "light" (white) and "dark" (black) with a periodic raster signal (vibration). Whereas the raster signal effects a vibrating lifting motion of the engraving stylus for producing the raster, the engraving signal, in conformity with the gradations to be reproduced, controls the geometric parameters of the engraved cups such as longitudinal diagonal, transverse diagonal and cut depth.

Occurring among other things in the signal processing stage are a calibration of the engraving signal values for "light" and "dark", the superimposition of the corrected engraving signal with the raster signal for generating the engraving control signal, and the amplification of the engraving control signal.

U.S. Pat. No. 5,424,845 already discloses a method for signal processing in an electronic engraving machine, whereby the engraving signal value for "dark" is known and the engraving signal value for "light" is input, whereby an offset value is additionally calculated from the engraving signal values.

When the engraving signal value for "dark" is set in a traditional signal processing unit, then the engraving signal value for "light" simultaneously changes. As a result thereof, a faulty transverse diagonal of the engraved cups for "light" results, and the operator must disadvantageously manually correct the engraving signal value for "light", so that the transverse diagonal or the engraved gradation remains constant given modification of the engraving signal value for "dark".

SUMMARY OF THE INVENTION

It is therefore an object of the present invention to improve a method for signal processing in an electronic engraving machine for engraving printing forms, particularly printing cylinders, for rotogravure such that the engraving signal value for "light" is automatically kept constant when the engraving signal value for "dark" changes.

According to the present invention, a method is provided for signal processing in an electronic engraving machine for engraving printing forms for rotogravure. Engraving control signal values are formed from engraving data that represent predetermined gradations between "light" and "dark" and from a periodic raster signal for generating a raster. An engraving stylus of an engraving element controlled by the engraving control signal values engraves a sequence of cups arranged in the raster into the printing form, engraving depths thereof defining the actually engraved gradations. The engraving element implements a feed motion along the printing form for engraving of the cups. Before the engraving, the engraving control signals for "light" and "dark" are calibrated by a light setting value and a dark setting value such that the engraved gradations "light" and "dark" correspond to the predetermined gradations "light" and "dark". For keeping the engraved gradation "light" constant when modifying the gradation "dark", the difference value between the old dark setting value and a new dark setting value is formed before the engraving. A new light setting value is calculated from the engraving datum for "light", from the old light setting value, and from the difference value. An automatic recalibration of the engraving control signal value for "light" is undertaken with the new light setting value.

BRIEF DESCRIPTION OF THE DRAWINGS

FIG. 3 is a graphic presentation for explaining the method.

DESCRIPTION OF THE PREFERRED EMBODIMENTS

Figure 1:
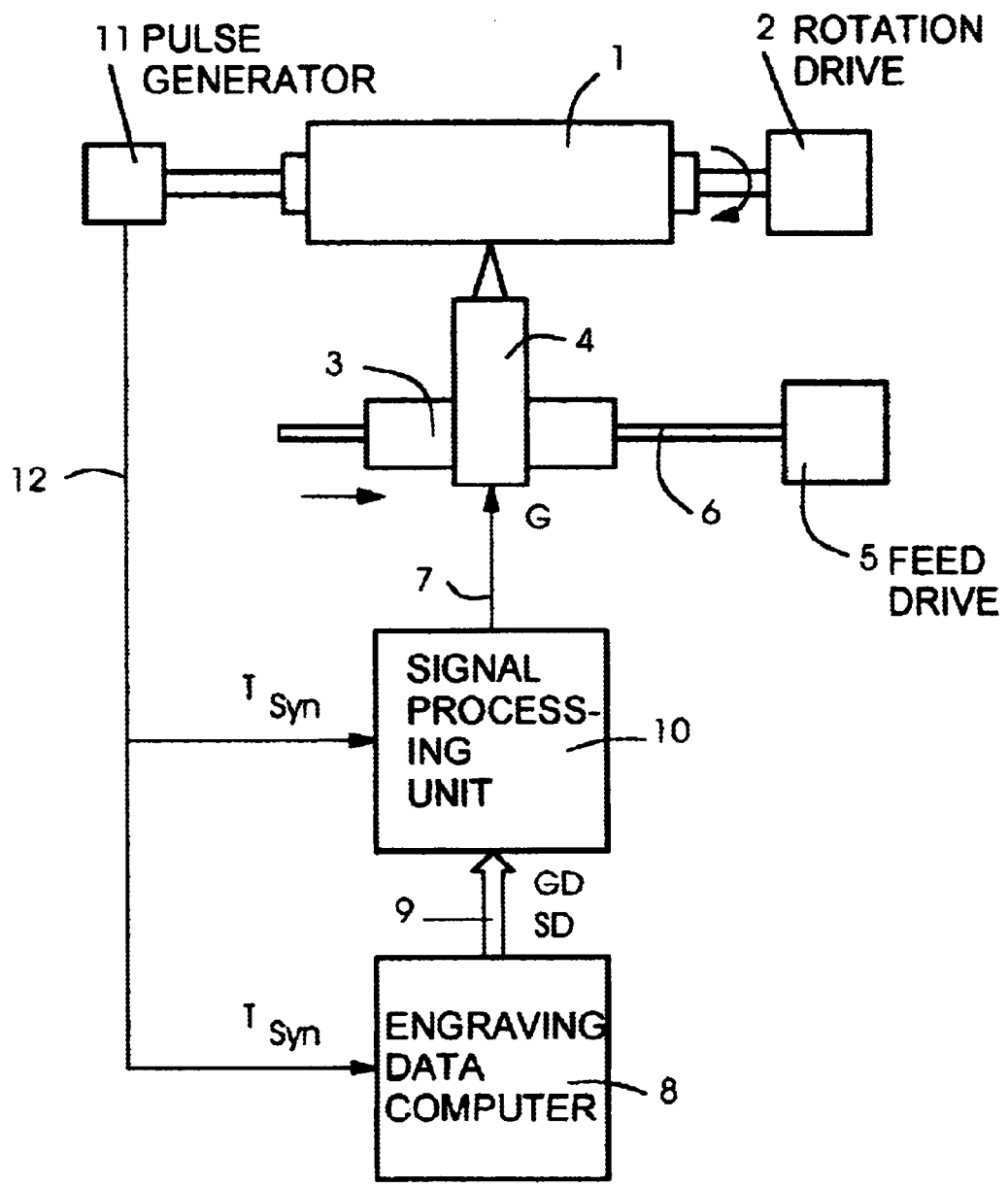
FIG. 1 is a schematic circuit block diagram of an engraving machine for engraving printing forms, comprising a signal editing unit.

FIG. 1 shows a schematic block circuit diagram of an engraving machine for engraving printing cylinders. A printing cylinder 1 is rotationally driven by a rotation drive 2. An engraving element 4 having an engraving stylus as a cutting tool and mounted on an engraving carriage 3, moves along the rotating printing cylinder 1 in an axial direction with the assistance of a spindle 6 driven by a feed drive 5.

The engraving stylus of the engraving element 4 controlled by an analog engraving control signal (G) on a line 7 cuts a sequence of cups arranged in a rotogravure raster engraving line by engraving line into the generated surface of the rotating printing cylinder 1 while the engraving element 4 moves axially along the printing cylinder 1. The engraving element 4 is designed, for example, as an engraving element with an electromagnetic drive for the engraving stylus.

Whereas a periodic raster signal effects a vibrating lifting motion of the engraving stylus for generating the rotogravure raster, engraving data (GD) corresponding to the gradations between "light" and "dark" to be engraved determine the penetration depths of the engraving stylus into the generated surface of the printing cylinder 1.

The engraving data (GD) are offered engraving line by engraving line in an engraving data computer 8, whereby an engraving datum of at least one byte is allocated to each cup to be engraved, this containing, among other things, the gradation to be engraved as engraving information. For example, the engraving datum $GD_L=161$ is allocated to the gradation "light", and the engraving datum $GD_T=0$ is allocated to the gradation "dark". Control data (SD) for controlling the signal processing are also offered in the engraving data computer 8.

Engraving data (GD) and control data (SD) are forwarded via a data bus 9 to a signal processing unit 10 in which the engraving control signal (G) for the engraving element 4 is generated.

For synchronization of the signal processing with the rotational movement of the printing cylinder 1, a pulse generator 11 is mechanically coupled to the printing cylinder 1. The pulse generator 11 generates a synchronization clock sequence ($T_{SYN}$) that is forwarded via a line 12 to the engraving data computer 8 and to the signal editing unit 10.

Figure 2:
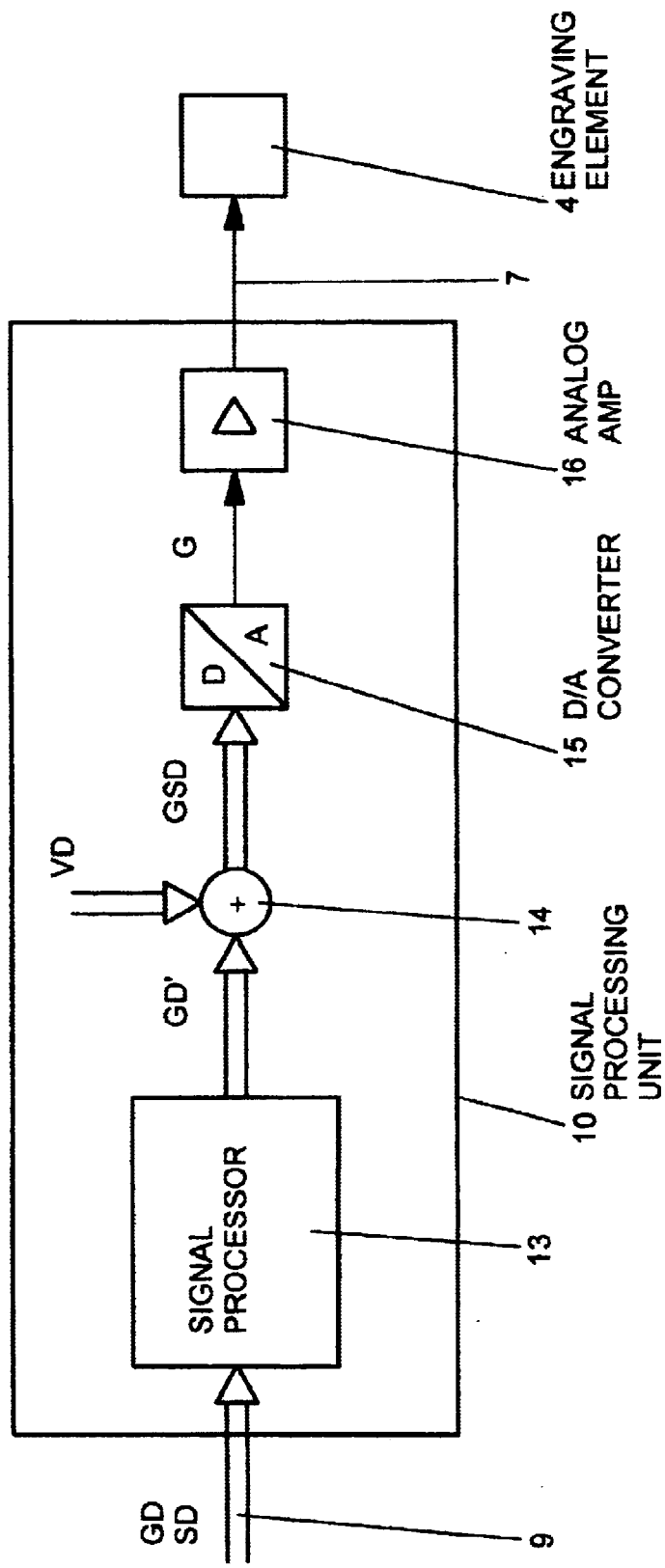
FIG. 2 is an exemplary embodiment of a signal editing unit.

FIG. 2 shows an exemplary embodiment of the signal editing unit 10. The engraving data (GD) and the control data (SD) are communicated in the signal editing unit 10 to a signal processor 13 via the data bus 9.

In the signal processor 13, the input engraving data (GD) are converted—with the assistance of stored setting values ($EP_L$) for "light" and of setting values ($EP_T$) for "dark"—by a calibration into output engraving data (GD') such that the actually engraved actual gradations "light" and "dark" correspond to the predetermined rated gradations "light" and "dark". The setting parameters ($EP_L$) for "light" thereby influence the amplification and the setting values ($EP_T$) for "dark" influence the offset of the transfer function GD'=f(GD) of the signal processor 13.

A processor that enables fast floating decimal point operations is employed as signal processor 13, preferably a digital signal processor (DSP). For example, the digital signal processor of the type TMS 320C31 of Texas Instruments can be utilized as signal processor 13.

Given such a digital signal processor, the setting values ($EP_L$) for "light" and the setting values ($EP_T$) for "dark" can be modified in a preferred way by transfer coefficients ($k_x$). At the same time, the input engraving data (GD), the transfer coefficients ($k_x$) and/or the calculation and operation. algorithms for the input engraving data (GD) can be varied by the control data (SD).

The calibration of the input engraving data (GD) into the output engraving data (GD') occurs according to the general equation:

$$GD'=(GD \times k_1) \times (EP_L \times k_2) + EP_T \times k_3$$

The following is valid for the gradation "light":

$$GD'_L=(GD_L \times k_1) \times (EP_L \times k_2) + EP_T \times k_3 \text{ (Gain correction)}$$

Deriving with $GD_L=161$ is:

$$GD'_L=(161 \times k_1) \times (EP_L \times k_2) + EP_T \times k_3$$

Valid for the gradation "dark" is:

$$GD'_T=(GD_T \times k_1) \times (EP_L \times k_2) + EP_T \times k_3 \text{ (Offset correction)}$$

Deriving with $GD_T=0$ is:

$$GD'_T=EP_T \times k_3$$

For acquiring the engraving control data (GSD), vibration data (VD) determining the raster signal are added to the calibrated output engraving data (GD') in an adder 14 according to the following equation:

$$GSD=(GD \times k_1) \times (EP_L \times k_2) + EP_T \times k_3 + VD$$

The engraving control data (GSD) are converted into the analog engraving control signal (G) in a D/A converter 15. The analog engraving control signal (G) is subsequently amplified in a following analog amplifier 16 and is output to the engraving element 4 via the line 7. The amplifier 10 can, for example, be designed as a switched power amplifier.

The method for keeping the engraved gradation "light" or, respectively, the transverse diagonal ($q_L$) of the engraved "light" cup constant when changing the gradation "dark" by automatic readjustment of the value for "light" is described in greater detail below.

A recalibration of the engraving signal values (GD) for "light" and "dark" with the setting values ($EP_L$, $EP_T$) for "light" and "dark" must be done given a new engraving job.

The setting values ($EP_{Lold}$, $EP_{Told}$) of the preceding calibration are stored. Given a recalibration, for example, the gradation "dark" should be corrected, and the corresponding setting value ($EP_{Tnew}$) for "dark" is prescribed. As already mentioned in the introduction to the specification, the gradation "light" changes given variation of the gradation "dark", and the value for "light" had to be previously manually readjusted in a disadvantageous way so that the transverse diagonal ($q_L$) of the cup "light" is preserved.

This disadvantage is eliminated by the automatic readjustment of the value "light", this being executed in a number of steps.

Before setting the new value for "dark", the difference value ($\Delta EP_T$) between the old setting value ($EP_{Told}$) and the prescribed, new setting value ($EP_{Tnew}$) for "dark" is formed according to the following equation in a first step:

$$\Delta EP_T = EP_{Told} - EP_{Tnew}$$

In a second step, a new setting value ($EP_{Lnew}$) for "light" is calculated from the engraving datum ($GD_L$) for "light", the old setting value ($EP_{Lold}$) for "light" and the previously identified difference value ($\Delta EP_T$).

First, the old and new output engraving datum (GD') that would derive given the old setting value ($EP_{Lold}$) and the new setting value ($EP_{Lnew}$) for "light" are determined according to the following, simplified equation, wherein the transfer coefficients ($k_x$) are omitted:

$$GD'=GD \times EP_L + EP_T$$

$$GD'=GD_L \times EP_{Lold} + EP_{Told}$$

$$GD'_{Lnew}=GD_L \times EP_{Lnew} + EP_{Tnew}$$

Since the engraving data for "light" are to be retained given modification of the engraving data for "dark", the following is valid:

$$GD'_{Lold}=GD'_{Lnew}$$

The new setting value ($EP_{Lnew}$) for "light" drives therefrom as:

$$EP_{Lnew}=1/GD_L(\Delta EP_T + GD_L \times EP_{Told})$$

The recalibration is then undertaken with the predetermined, new setting value ($EP_{Tnew}$) for "dark" and the calculated, new setting value ($EP_{Lnew}$) for "light", whereby the engraving element 4 already lies against the printing cylinder 1. So that the engraving stylus of the engraving element 4 does not already engrave incorrect cups into the generated surface of the printing cylinder 1 during the recalibration, the sequence in which the new setting values ($EP_{Lnew}$, $EP_{Tnew}$) are activated is advantageously implemented dependent on the previously determined difference ($\Delta EP_T$) between the old setting value ($EP_{Told}$) and the new setting value ($EP_{Tnew}$) for "dark". When the difference ($\Delta EP_T$) is positive, "dark" is expediently set first, followed by "light". When the difference ($\Delta EP_T$) is negative, there is a different sequence.

FIG. 3 shows a graphic illustration for explaining the method. The setting values (EP) are shown on the ordinate. The lines "light" and "dark" shown broken in the illustration symbolize the DC part by which the engraving stylus of the engraving element 4 vibrated around the raster signal.

When the value "old dark" is set to the value "new dark" by $\Delta T$ in the calibration, the value "old light" undesirably changes by $\Delta L$ to the new value "new light" in the traditional procedure. Due to the automatic correction 17, the value "old light" is retained given modification of the value "dark old" to the value "dark new".

It is possible to keep the transverse diagonal constant with a similar procedure when the raster signal is modified.

Although various minor changes and modifications might be proposed by those skilled in the art, it will be understood that my wish is to include within the claims of the patent warranted hereon all such changes and modifications as reasonably come within my contribution to the art.

I claim:

1. A method for signal processing in an electronic engraving machine for engraving a printing form for rotogravure, comprising the steps of:

forming engraving control signal values from engraving data that represent predetermined gradations between "light" and "dark" and from a periodic raster signal for generating a raster;

before engraving, calibrating the engraving control signal for "light" and "dark" by a light setting value and a dark setting value such that engraved gradations "light" and "dark" correspond to predetermined gradations "light" and "dark";

for keeping the engraved gradation "light" constant when modifying the gradation "dark" forming a difference value between the old dark setting value and a new dark setting value before the engraving;

calculating a new light setting value from an engraving datum for "light", from the old light setting value, and from the difference value;

undertaking an automatic recalibration of the engraving control signal value for "light" with the new light setting value;

engraving with an engraving stylus of an engraving element controlled by the engraving control signal values a sequence of cups arranged in the raster into the printing form, engraving depths thereof defining the actually engraved gradations; and implementing with the engraving element a feed motion along the printing form for the engraving of the cups.

2. The method according to claim 1, wherein the calculation of the new light setting value occurs according to the following equation:

$$EP_{Lnew} = 1/GD_L(GD_L \times EP_{Lold} + \Delta EP_T)$$

where $EP_{Lnew}$ is the new light setting value, $GD_L$ is the engraving datum $EP_{Lold}$ is the old light setting value $\Delta EP_T$ is the difference value.

3. The method according to claim 1 wherein the sequence of the calibration of the engraving control signal value is implemented dependent on the identified difference between the old dark setting value and the new dark setting value.

4. The method according to claim 1 wherein the printing form comprises a printing cylinder.

5. The method according to claim 1 wherein "light" corresponds to white and "dark" corresponds to black.

6. A method for signal processing in an electronic engraving machine for engraving a printing form for rotogravure, comprising the steps of:

forming engraving control signal values from engraving data that represent predetermined gradations between "light" and "dark" and from a periodic raster signal for generating a raster;

before engraving, calibrating the engraving control signal for "light" and "dark" by a light setting value and a dark setting value such that engraved gradations "light" and "dark" correspond to predetermined gradations "light" and "dark";

for keeping the engraved gradation "light" constant when modifying the gradation "dark" forming a difference value between the old dark setting value and a new dark setting value before the engraving;

calculating a new light setting value from an engraving datum for "light", from the old light setting value, and from the difference value;

undertaking an automatic recalibration of the engraving control signal value for "light" with the new light setting value; and engraving a sequence of cups arranged in the raster into the printing form.

\* \* \* \* \*